United States Patent [19]

Clifford et al.

[11] Patent Number: 5,308,803
[45] Date of Patent: May 3, 1994

[54] GLASS COMPOSITIONS

[75] Inventors: John F. Clifford, Sydenham; Ivan Wozniak, Stoke-on-Trent; Peter J. Smith, Kidlington, all of United Kingdom

[73] Assignee: Cookson Group PLC, London, United Kingdom

[21] Appl. No.: 896,002

[22] Filed: Jun. 10, 1992

[30] Foreign Application Priority Data

Jun. 14, 1991 [GB] United Kingdom ............... 9112886
Aug. 29, 1991 [GB] United Kingdom ............... 9118500

[51] Int. Cl.$^5$ .............................................. C03C 8/14
[52] U.S. Cl. ........................................ 501/17; 501/21; 501/63; 501/64; 501/65; 501/66; 501/68; 501/69; 501/70; 501/72; 501/67; 428/701
[58] Field of Search ................. 501/77, 78, 79, 64, 501/65, 66, 67, 68, 69, 72, 17, 21; 428/701

[56] References Cited

U.S. PATENT DOCUMENTS

| | | | |
|---|---|---|---|
| 4,282,035 | 8/1981 | Nigrin | 106/48 |
| 4,554,258 | 11/1985 | Francel | 501/21 |
| 4,892,847 | 1/1990 | Reinherz | 501/21 |

FOREIGN PATENT DOCUMENTS

| | | |
|---|---|---|
| 0370683 | 5/1990 | European Pat. Off. . |
| 370683 | 5/1990 | European Pat. Off. . |
| 2033137 | 2/1971 | Fed. Rep. of Germany ........ 501/64 |
| 2451282 | 5/1976 | Fed. Rep. of Germany ........ 501/17 |
| 2495190 | 6/1982 | France . |

OTHER PUBLICATIONS

*Chemical Abstracts* 110:100555t, vol. 110, No. 6, Mar. 20, 1989.

*Primary Examiner*—Mark L. Bell
*Assistant Examiner*—C. M. Bonner
*Attorney, Agent, or Firm*—Watson, Cole, Grindle & Watson

[57] ABSTRACT

A glass composition which is essentially free from lead and cadmium comprises, in mole percent, $SiO_2$:35 to 75%, $Bi_2O_3$:0.1 to 15%, $Al_2O_3$:0.1 to 10%, $B_2O_3$:1 to 30%, at least one of $Li_2O$, $Na_2O$, $K_2O$:5 to 30%, $ZrO_2$:0.1 to 10%, and certain other optional ingredients, with the proviso that BaO and ZnO are not contained in an amount of more than 2 mole percent. These glass compositions can be used as fluxes for mixing with pigments to provide compositions for the decoration of ceramic materials and/or glass.

19 Claims, No Drawings

GLASS COMPOSITIONS

BACKGROUND OF THE INVENTION

The present invention relates to glass compositions, and in particular to glass compositions which are of minimal toxicity and are substantially free of lead and cadmium and which can be used as fluxes for mixing with pigments to provide compositions for the decoration of ceramic materials and/or glass.

Occasional episodes of lead poisoning have resulted from the use of improperly formulated and fired lead-containing glasses and/or fluxes on ceramic ware. Whilst lead-containing glasses and fluxes can be prepared which are safe and meet current requirements for permissible lead release to food with which they come into contact, the problem of lead poisoning is avoided if lead itself is avoided. In addition, various pollution controls regarding the use of lead and limits on the content of lead in waste water can be avoided by the use of lead-free glazes and fluxes.

Various attempts have been made to produce lead-free fluxes for mixing with pigments to provide compositions for the decoration of ceramic material and glass. U.S. Pat. No. 4,282,035 and U.S. Pat. No. 4,446,241 disclose Pb- and Cd- free glass frits for use in enamels which are based within the $R_2O$-$RO$-$Al_2O_3$-$ZrO_2$ (where $R_2O$ is an alkali metal oxide and RO is an alkaline earth metal oxide) and $Li_2O$-$B_2O_3$-$SiO_2$ systems, respectively. U.S. Pat. No. 4,590,171 describes Pb- and Ca- free glass frits suitable for use in enamels in contact with foodstuffs which contain $Li_2O$, $Na_2O$, BaO, $B_2O_3$, $Al_2O_3$, $SiO_2$, $ZrO_2$ and F as essential ingredients.

U.S. Pat. No. 4,554,258 describes glass frit compositions which are free of lead, arsenic and cadmium for use in decorative tableware enamels, and which consist of the following components, in parts by weight:

| | |
|---|---|
| $Bi_2O_3$ | 48–57 |
| $SiO_2$ | 29–38 |
| $B_2O_3$ | 3–8 |
| $R_2O$ | 2–8 |
| $TiO_2$ | 0–2 |
| $ZrO_2$ | 0–8 |
| $Al_2O_3$ | 0–2 |
| BaO | 0–4 |
| ZnO | 0–3 |
| CaO | 0–9 |

U.S. Pat. No. 4,892,847 discloses Pb- free glass frits suitable for use in decorative enamels on glassware and on chinaware, which contain the following components, in parts by weight:

| | |
|---|---|
| $SiO_2$ | 25–35 |
| $Bi_2O_3$ | 25–43 |
| $B_2O_3$ | 12–25 |
| alkali metal oxide | 4–19 |
| $ZrO_2$ | 0–3 |
| $TiO_2$ | 0–5 |
| ZnO | 0–6 |
| CaO | 0–4 |
| SrO | 0–15 |
| BaO | 0–19 |
| $Al_2O_3$ | 0–4 |
| $NO_2$ | 0–10 |
| $WO_3$ | 0–1 |
| $Ce_2O_3$ | 0–1.5 |
| $Cr_2O_3$ | 0–7 |
| CoO | 0–15 |
| MnO | 0–8 |
| $P_2O_5$ | 0–10 |

Finally, EP-A No. 267154 describes Pb and Cd- free glass frit compositions for enamel decoration which consist of the following components in terms of moles per cent:

| | |
|---|---|
| $Na_2O$ | 3.9–18.5 |
| ZnO | 4.0–30.0 |
| $B_2O_3$ | 3.9–17.5 |
| $SiO_2$ | 40.0–74.0 |
| $K_2O$ | 0–8.0 |
| $Li_2O$ | 0–5.0 |
| CaO | 0–8.0 |
| SrO | 0–8.0 |
| BaO | 0–9.0 |
| $Bi_2O_3$ | 0–10.0 |
| $Al_2O_3$ | 0–4.0 |
| $ZrO_2$ | 0–6.0 |
| $TiO_2$ | 0–7.0 |
| $WO_3$ | 0–1.0 |

While all the aforementioned glasses are alleged to have many desirable properties, their widespread use as glassy fluxes is limited by shortcomings in certain key areas.

A glossy flux to be used for on-glaze enamel decoration must simultaneously satisfy a number of key requirements. Firstly, the softening point of the flux should be such as to allow maturation within the temperature range of from 750° to 900° C., which are typical on-glaze enamelling temperatures for decoration on bone china, earthenware or hotelware pieces.

Secondly, the glossy flux should be compatible with a wide variety of colourants.

Thirdly, the glassy flux should display good resistance to devitrification and to pronounced opacity during a conventional enamel firing schedule in order to promote good colour development with a glossy finish.

Finally, the durability of the glassy flux should be such as to enable the fired colours to withstand attack by acidic foodstuffs and alkali detergents. With controls on permissable levels of metal release into acidic and alkali solutions becoming more stringent, more exacting demands are being placed on the durability requirements of decorated pieces.

In the light of the present invention, it is important to stress that it is the durability of the final product, i.e fired colour, which is of concern, not that of the glassy frit which may change in use.

The core glass system for U.S. Pat. No. 4,554,258 and U.S. Pat. No. 4,892,842 is $R_2O$-$Bi_2O_3$-$B_2O_3$-$SiO_2$, whilst for EP-A No. 267154 it is $Na_2O$-ZnO-$B_2O_3$-$SiO_2$.

SUMMARY OF THE INVENTION

The basic glass system of the present invention is $R_2O$-$ZrO_2$-$Bi_2O_3$-$B_2O_3$-$Al_2O_3$-$SiO_2$ and is outside the scope of the prior are both in terms of the core glass-forming systems and in terms of the precise compositions themselves.

We have now developed a glass composition which can be used as a flux which simultaneously meets, or at least substantially meets, the aforementioned key requirements.

Accordingly the present invention provides a glass composition which is essentially free from lead and cadmium and which comprises the following components:

|  | Mole Percent |
| --- | --- |
| $SiO_2$ | 35–75 |
| $Bi_2O_3$ | 0.1–15 |
| $Al_2O_3$ | 0.1–10 |
| $B_2O_3$ | 1–30 |
| lanthanoid oxide | 0–5 |
| at least one of | 5–30 (in total) |
| $Li_2O$, $Na_2O$, $K_2O$ |  |
| optionally one or more of | 0–10 (in total) |
| ZnO, MgO, CaO, SrO, BaO |  |
| $ZrO_2$ | 0.1–10 |
| $TiO_2$ | 0–5 |
| $WO_3$ | 0–5 |
| $MoO_3$ | 0–5 |
| optionally one or more | 0–10 (in total) |
| of $Y_2O_3$, $HfO_2$, |  |
| $Nb_2O_5$, $SnO_2$ |  | with the proviso that ZnO and BaO are each not contained in an amount of more than 2 mole percent.

The glass composition of the present invention preferably comprises from 0.1 to 12 mole percent of $Bi_2O_3$, more preferably from 0.1 to 10 mole percent of $Bi_2O_3$, still more preferably from 0.5 to 4.0 mole percent of $Bi_2O_3$; from 45 to 70 mole percent of $SiO_2$, more preferably from 50 to 70 mole percent of $SiO_2$, still more preferably from 50 to 65 mole percent of $SiO_2$; from 0.5 to 5 mole percent of $Al_2O_3$, more preferably from 1 to 5 mole percent of $Al_2O_3$, still more preferably from 1 to 3 mole percent of $Al_2O_3$; from 8 to 25 mole percent of $R_2O$, more preferably from 8 to 22 mole percent of $R_2O$, still more preferably from 12 to 22 mole percent of $R_2O$. The ZnO and BaO contents of the glass compositions of the present invention are preferably each less than 1.0 mole percent, more preferably each less than 0.5 mole percent.

A preferred composition containing a lanthanoid oxide comprises the following components:

|  | Mole Percent |
| --- | --- |
| $SiO_2$ | 40–70 |
| $Bi_2O_3$ | 0.1–15 |
| $Al_2O_3$ | 1–10 |
| $B_2O_3$ | 1–25 |
| lanthanoid oxide | 0.1–5 |
| least one of | 5–30 |
| $Li_2O$, $Na_2O$, $K_2O$ |  |
| optionally one or more of | 0–10 |
| ZnO, MgO, CaO, SrO, BaO |  |
| $ZrO_2$ | up to 5 |
| $TiO_2$ | 0–5 |
| $WO_3$ | 0–5 |
| $MoO_3$ | 0–3 |
| optionally one or more of | 0–5 |
| $Y_2O_3$, $HfO_2$, |  |
| $Nb_2O_5$, $SnO_2$ |  | with the proviso that ZnO and BaO are each not contained in an amount of more than 2 mole percent.

A more preferred glass composition of the present invention containing a lanthanoid oxide preferably comprises from 0.1 to 12 mole percent of $Bi_2O_3$, more preferably from 0.1 to 10 mole percent of $Bi_2O_3$, still more preferably from 0.5 to 4.0 mole percent of $Bi_2O_3$; from 45 to 70 mole percent of $SiO_2$, more preferably from 50 to 65 mole percent of $SiO_2$; from 0.5 to 5 mole percent of $Al_2O_3$, more preferably from 1 to 5 mole percent of $Al_2O_3$, still more preferably from 1 to 3 mole percent of $Al_2O_3$; from 8 to 25 mole percent of $R_2O$, more preferably from 8 to 22 mole percent of $R_2O$, still nore preferably from 12 to 22 mole percent of $R_2O$.

When a lanthanoid oxide is used in the glass composition of the present invention, it is preferably lanthanum, which is preferably used in an amount of from 0.5 to 3 mole percent.

The composition of the present invention contains $ZrO_2$ in order to improve the resistance of the composition to attack by alkali and detergent solutions, and preferably contains $TiO_2$ in order to improve the resistance of the compositions to attack by acid. The preferred amounts of $ZrO_2$ and $TiO_2$ for use in the glass compositions of the invention are 0.1 to 3.0 mole preferably for $TiO_2$, and 0.1 to 6.0 mole percent for $ZrO_2$, preferably 0.1 to 3.0 mole when the compositions contain a lanthanoid oxide.

The glasses of the invention can be prepared from natural (benificated) rocks and minerals, e.g., limestone, silica sand, etc. as well as "fine chemicals".

The various minerals and/or oxides used in the preparation of the compositions of the present invention are usually in the form of fine powders. Precursors of these oxides can also be useful, providing that they decompose to form the required oxides at temperatures below the melting temperature of the glass. Suitable "fine chemical" precursors are the nitrites, nitrates, carbonates, metal organic salts, for example citrates, acetates, etc.

The glass of the present invention may be prepared by mixing together materials, charging the mixture of materials to a glass melting furnace at a temperature sufficiently high to produce the fluxed glass and then fritting the glass by pouring it into water, or by passing it through water-cooled rolls. It may be preferred to carry out the melting and fritting operation in an oxidising atmosphere, or to include a oxygen rich component in the mixture which is melted and fused. The frit may be ground into a powder by conventional grinding techniques.

The glasses of the present invention are preferably fluxes which are used in combination with one or more pigments as a colour on ceramic materials or glass.

It will be understood by those skilled in the art that for use as a flux, the glass compositions must mature or yield a smooth continuous surface at temperatures below the melting temperatures of the glazes on the ceramic articles on which they are to be used. Generally, the glass compositions will melt at a temperature of below 1150° C., preferably at a temperature in the range of from 900° to 1100° C.

The present invention thus includes within its scope a composition for the decoration of ceramic materials and/or glasses which comprise a glass frit as hereinbefore described in admixture with one or more pigments, or other colourants such as metallic crystallites. The composition for the decoration of ceramic materials and/or glass may additionally contain a plastic binder therein.

The fluxes of the present invention are compatible both with conventional glazes on ceramic materials and with the bismuth based glazes which are described in our European Patent Application No. 91303072.2.

The fluxes of the present invention give good colour development, i.e. the colour of the pigment is bright and "sharp" and is not adversely affected by the flux.

As mentioned above, the glass frits of the present invention preferably contain lanthanum which may improve the colour development of the fluxes and the alkaline durability.

The present invention will be further described with reference to the following non-limiting Examples.

EXAMPLE 1

A glass frit was prepared by fusing a mixture of the following materials at 1300° C. and fritting the glass so-produced by pouring in into water:

|  | Mole Percent |
| --- | --- |
| $SiO_2$ | 48.54 |
| $Bi_2O_3$ | 9.69 |
| $B_2O_3$ | 17.40 |
| $Al_2O_3$ | 3.75 |
| $ZrO_2$ | 2.81 |
| $TiO_2$ | 2.60 |
| $Na_2O$ | 11.77 |
| $Li_2O$ | 3.44 |

The coarse frit was ground to give a particle size distribution of 90% less than 16 micrometres. Using a pigment to glass frit ratio of 1:4 by weight, green (chromium oxide) and brown (doped iron oxide) colours were prepared, silk-screen printed and fired onto bone china glazed with a traditional unleaded glaze and with the glaze as described in our European Patent Application No. 91303072.2 at a heating rate of 13° C. per minute to 820° C., with a dwell time of 20 minutes. The resulting colours were glossy and possessed acceptable durability.

EXAMPLE 2

The procedure of Example 1 was repeated with a glass frit prepared from the following components:

|  | Mole Percent |
| --- | --- |
| $SiO_2$ | 61.17 |
| $Bi_2O_3$ | 3.15 |
| $B_2O_3$ | 12.68 |
| $Al_2O_3$ | 2.15 |
| $ZrO_2$ | 1.79 |
| $TiO_2$ | 1.84 |
| $Li_2O$ | 7.38 |
| $Na_2O$ | 8.30 |
| $K_2O$ | 1.54 |

As in Example 1, the fired colours were glossy and displayed acceptable durability.

EXAMPLE 3

A glass frit made from the following constituents was prepared according to the procedure of Example 1:

|  | Mole Percent |
| --- | --- |
| $SiO_2$ | 51.10 |
| $Bi_2O_3$ | 0.70 |
| $B_2O_3$ | 23.45 |
| $Al_2O_3$ | 1.27 |
| $ZrO_2$ | 2.12 |
| $TiO_2$ | 1.63 |
| $CaO$ | 1.18 |
| $Li_2O$ | 8.75 |
| $Na_2O$ | 8.43 |
| $K_2O$ | 1.37 |

The coarse frit was ground, blended with an equal weight of a brown pigment (doped iron oxide) and fused at 800° C. for 10 minutes. The resulting fused mass was ground to give a particle size distribution of 50% less than 16 micrometres. The brown colour was printed by lithographic methods and fired on bone china glazed with a traditional unleaded glaze using a heating rate of 13° C. per minute to 820° C. and on bone china glazed with the glaze as described in our European Patent Application No. 91303072.2 using a heating rate of 16° C. per minute to 800° C. with a dwell time of 20 minutes in both cases. For both types of glaze surfaces the resulting colours were glossy and displayed acceptable durability.

EXAMPLES 4 to 6

Glass frit were prepared by fusing the mixtures of the materials listed below at 1300° C. and fritting the glasses so-produced by pouring then into water. The amounts of the components are expressed in terms of mole percent:

|  | 4 | 5 | 6 |
| --- | --- | --- | --- |
| $SiO_2$ | 42.90 | 66.47 | 61.66 |
| $Al_2O_3$ | 3.43 | 2.21 | 2.18 |
| $B_2O_3$ | 15.69 | 7.11 | 11.48 |
| $Bi_2O_3$ | 8.75 | 3.24 | 3.24 |
| CaO | — | 1.58 | — |
| SrO | — | — | 1.00 |
| ZnO | — | — | — |
| $Li_2O$ | 20.56 | 6.40 | 7.54 |
| $Na_2O$ | 3.61 | 2.21 | 8.51 |
| $K_2O$ | 2.43 | 8.29 | 1.58 |
| $TiO_2$ | — | — | — |
| $ZrO_2$ | 1.80 | 1.67 | 1.81 |
| $La_2O_3$ | 0.83 | 0.82 | 1.00 |
| $CeO_2$ | — | — | 1.00 |
| Flow (%) | 145 | 54 | 88 |
| Alkali | 1 | — | 2 |
| Acid | 1 | — | 1 |

Following fritting, the coarse frit was ground to give a particle size distribution of 90% less than 16 micrometres. The powdered fluxes were than tested by means of a "Flow Trial". This is a standard test used to give a measure of the melting and flow (viscosity) characteristics of a flux, whilst also providing information on its stability, i.e., resistance to devitrification and phase immiscibility.

For the flow trials, 1.5 g of flux powder was dry pressed into a disc and placed in a circular slot at the mouth of a flow channel in a flow trial slab. The slab was mounted at an angle of 33 degrees and fired at a ramp rate of 4° C. per minute to 750° C., with a dwell time of 1 hour and a cooling rate of 4° C. per minute. The extent of flow was measured as a percentage of the flow undergone by a 'standard' flux under identical flow trial conditions. The 'standard' flowed to a length of 24 mm in the flow trial test.

Following the procedure of Example 1, fired green and brown colours were prepared. Both alkali and acid durabilities of the fired colours were assessed. For the alkali test, the test conditions were immersion for 7 hours in a concentrated solution of a sodium phosphate - based commercial detergent held at 77° C., giving a pH=13. The acid test involved a 100 hour immersion in a 4% acetic acid solution at 25° C., giving a pH=4.

Following completion of the test, acid and alkali durabilities were evaluated by assigning a number according to the following convention:

Durability Rating

1=No visible loss of colour or gloss.

2=Some loss of gloss and possible fading of colour.
3=Gloss removed.
4=Gloss removed and some loss of colour.
5=Considerable attack causing removal of colour.

EXAMPLES 7 to 25

Following the general procedure of Example 1, glass frits were prepared having the compositions detailed in Table 1 below, the amounts of the components being expressed in mole percent.

The flow values and alkali and acid resistance were assessed by the procedures as detailed in the preceding Examples 4 to 6.

TABLE 1

|  | 7 | 8 | 9 | 10 | 11 | 12 | 13 | 14 | 15 | 16 | 17 |
|---|---|---|---|---|---|---|---|---|---|---|---|
| $SiO_2$ | 51.40 | 50.86 | 62.91 | 59.16 | 68.71 | 56.21 | 52.13 | 46.77 | 44.10 | 44.20 | 44.62 |
| $Al_2O_3$ | 4.10 | 3.95 | 2.09 | 1.97 | 2.28 | 2.19 | 2.27 | 2.04 | 1.27 | 0.67 | 1.27 |
| $B_2O_3$ | 18.90 | 18.34 | 11.62 | 15.81 | 4.81 | 16.22 | 22.46 | 25.21 | 23.17 | 24.45 | 23.25 |
| $Bi_2O_3$ | 10.48 | 10.66 | 2.31 | 1.42 | 3.39 | 2.41 | 1.64 | 1.47 | 0.69 | 1.43 | 0.69 |
| CaO | — | — | 1.52 | 1.42 | 1.65 | — | 0.70 | 0.63 | 1.16 | — | 1.10 |
| $Li_2O$ | — | — | 6.07 | 5.70 | 6.62 | 6.34 | 7.82 | 9.41 | 12.98 | 11.38 | 12.99 |
| $Na_2O$ | 11.45 | 11.18 | 7.92 | 12.89 | 2.28 | 8.52 | 10.09 | 11.31 | 10.39 | 10.97 | 10.39 |
| $K_2O$ | — | — | 3.97 | 0.14 | 8.53 | 2.00 | 1.64 | 1.47 | 2.05 | 2.17 | 2.05 |
| $TiO_2$ | 2.16 | 2.13 | — | — | — | — | — | — | 1.61 | 2.55 | — |
| $ZrO_2$ | 1.51 | 2.88 | 1.59 | 1.49 | 1.73 | 6.11 | 1.25 | 1.69 | 2.58 | 2.18 | 3.64 |
| Flow (%) | 77 | 64 | 67 | 82 | 61 | 107 | 172 | 195 | 275 | 245 | >292 |
| Alkali | 3 | ⅔ | ⅔ | 3 | 2 | ⅔ | 3 | — | ⅔ | — | 4 |
| Acid | 1 | 1 | 1 | 1 | 1 | ⅔ | ⅔ | 1 | 1 | 1 | 1 |

|  | 18 | 19 | 20 | 21 | 22 | 23 | 24 | 25 |
|---|---|---|---|---|---|---|---|---|
| $SiO_2$ | 62.63 | 62.06 | 56.23 | 70.23 | 70.07 | 70.22 | 37.86 | 46.75 |
| $Al_2O_3$ | 2.21 | 2.19 | 1.99 | 1.45 | 1.45 | 1.45 | 2.84 | 1.06 |
| $B_2O_3$ | 12.99 | 12.87 | 11.66 | 12.55 | 12.53 | 12.55 | 23.23 | 16.80 |
| $Bi_2O_3$ | 3.23 | 3.20 | 2.90 | 0.47 | 0.47 | 0.47 | 1.04 | 0.68 |
| CaO | — | — | — | — | — | — | 2.06 | 1.19 |
| $Li_2O$ | 5.07 | 5.03 | 19.46 | 9.03 | 4.82 | 9.04 | 7.81 | 12.88 |
| $Na_2O$ | 3.53 | 3.50 | 2.07 | 2.55 | 2.55 | 2.55 | 16.98 | 10.09 |
| $K_2O$ | 5.69 | 5.63 | 0.69 | 1.10 | 5.50 | 1.10 | — | 2.12 |
| $TiO_2$ | 1.88 | 1.87 | 1.69 | 1.59 | 1.58 | 1.59 | — | 1.66 |
| $ZrO_2$ | 2.77 | 3.65 | 3.31 | 1.03 | 1.03 | 1.03 | 8.18 | 6.77 |
| Flow (%) | 157 | 270 | >292 | 132 | 128 | 116 | 170 | 40 |
| Alkali | 3 | 4/5 | ⅔ | ⅔ | 3 | ⅔ | ⅔ | 5 |
| Acid | 2 | 2 | 1 | 1 | 1 | 1 | 3 | — |

EXAMPLES 26 to 29

Following the general procedure of Example 1, glass frits were prepared having the compositions detailed in Table 2 below, the amounts of the components being expressed in mole percent.

The flow values and alkali and acid resistance were assessed by the procedures as detailed in Examples 4 to 6, above:

TABLE 2

|  | 26 | 27 | 28 | 29 |
|---|---|---|---|---|
| $SiO_2$ | 59.38 | 68.24 | 40.62 | 57.29 |
| $Al_2O_3$ | 2.17 | 2.28 | 0.27 | 5.91 |
| $B_2O_3$ | 11.59 | 2.00 | 23.25 | 11.77 |
| $Bi_2O_3$ | 3.22 | 5.67 | 0.79 | 15.00 |
| MgO | — | 1.65 | 1.00 | — |
| CaO | — | — | 7.00 | 0.66 |
| ZnO | — | — | 2.00 | — |
| $Li_2O$ | 7.50 | 6.62 | 10.99 | 2.63 |
| $Na_2O$ | 8.47 | 2.23 | 10.39 | 5.98 |
| $K_2O$ | 1.57 | 8.53 | 2.05 | 0.09 |
| $ZrO_2$ | 1.80 | 0.73 | 1.64 | 0.69 |
| $HfO_2$ | — | 1.00 | — | — |
| $Nb_2O_5$ | 0.50 | — | — | — |
| $MoO_3$ | — | 1.00 | — | — |
| $WO_3$ | 1.00 | — | — | — |
| $Y_2O_3$ | 1.00 | — | — | — |
| $SnO_2$ | 2.00 | — | — | — |
| Flow (%) | 88 | 67 | >292 | 137 |
| Alkali | 2 | 3 | ⅔ | — |
| Acid | 1 | 1 | 4 | — |

We claim:

1. An on-glaze glass flux composition suitable for coating onto a glazed surface which is essentially free from lead and cadmium and which consists of the following components:

|  | Mole Percent |
|---|---|
| $SiO_2$ | 45–70 |
| $Bi_2O_3$ | 0.5–4 |
| $Al_2O_3$ | 0.1–10 |
| $B_2O_3$ | 1–30 |
| lanthanoid oxide | 0–20 |
| at least one of $Li_2O$, $Na_2O$, $K_2O$ | 5–30 (in total) |
| one or more of ZnO, MgO, CaO, SrO, BaO | 0–10 (in total) |
| $ZrO_2$ | 0.1–10 |
| $TiO_2$ | 0–5 |
| $WO_3$ | 0–5 |
| $MoO_3$ | 0–5 |
| one or more of $Y_2O_3$, $HfO_2$, $Nb_2O_5$, $SnO_2$ | 0–10 (in total) | with the proviso that ZnO and BaO are each not contained in an amount of more than 2 mole percent.

2. Glass composition according to claim 1 which comprises from 50 to 65 mole percent of $SiO_2$.

3. Glass composition according to claim 1 which comprises from 1 to 3 mole percent of $Al_2O_3$.

4. Glass composition according to claim 1 which comprises from 10 to 22 percent of $R_2O$.

5. Glass composition according to claim 1 which includes from 0.1 to 6.0 mole percent of $ZrO_2$.

6. Glass composition according to claim 1 which consists of the following components:

|  | Mole Percent |
|---|---|
| $SiO_2$ | 45-70 |
| $Bi_2O_3$ | 0.5-4 |
| $Al_2O_3$ | 0.1-10 |
| $B_2O_3$ | 1-25 |
| lanthanoid oxide | 0.1-5 |
| at least one of $Li_2O, Na_2O, K_2O$ | 5-30 |
| one or more of $ZnO, MgO, CaO, SrO, BaO$ | 0-10 |
| $ZrO_2$ | up to 5 |
| $TiO_2$ | 0-5 |
| $WO_3$ | 0-5 |
| $MoO_3$ | 0-3 |
| one or more of $Y_2O_3, HfO_2, Nb_2O_5, SnO_2$ | 0-5 | with the proviso that ZnO and BaO are each not contained in an amount of more than 2 mole percent.

7. A glass composition according to claim 6 which comprises from 50 to 65 mole percent of $SiO_2$.

8. A glass composition according to claim 6 which comprises from 1 to 3 mole percent of $Al_2O_3$.

9. Glass composition according to claim 6 which comprises from 10 to 22 mole percent of $R_2O$.

10. Glass composition according to claim 6 wherein the lanthanoid oxide is $La_2O_3$.

11. Glass composition according to claim 6 wherein the rare earth oxide is $La_2O_3$.

12. Glass composition according to claim 6 which comprises from 0.5 to 3 mole percent of $La_2O_3$.

13. Glass composition according to claim 6 which includes from 0.1 to 3.0 mole percent of $TiO_2$.

14. Composition for the decoration of ceramic materials and/or glass which comprises a glass flux as claimed in claim 1 in admixture with a colouring component selected from the group consisting of a pigment and another colourant.

15. Composition according to claim 14 which additionally includes a plastic binder therein.

16. Composition for the decoration of ceramic materials and/or glass which comprises a glass flux as claimed in claim 6 in admixture with a colouring component selected from the group consisting of a pigment and another colourant.

17. A composition according to claim 14 which additionally includes a plastic binder therein.

18. An article selected from the group consisting of a ceramic article and a glass article which has been decorated using a composition according to claim 14.

19. An article selected from the group consisting of a ceramic article and a glass article which has been decorated using a composition according to claim 16.

* * * * *